United States Patent [19]

Pluijms et al.

[11] Patent Number: 4,746,345
[45] Date of Patent: May 24, 1988

[54] METHOD OF MANUFACTURING SOLID GLASS PREFORMS FROM HOLLOW PREFORMS

[75] Inventors: René A. M. Pluijms; Jacob W. de Ruiter, both of Eindhoven; Hubertus J. E. M. Schrans, Winschoten; Johannes P. de Meij, Eindhoven, all of Netherlands

[73] Assignee: U.S. Philips Corp., New York, N.Y.

[21] Appl. No.: 915,917

[22] Filed: Oct. 2, 1986

Related U.S. Application Data

[60] Division of Ser. No. 759,568, Jul. 26, 1985, abandoned, which is a continuation-in-part of Ser. No. 697,553, Feb. 1, 1985, abandoned.

[30] Foreign Application Priority Data

Jul. 13, 1984 [NL] Netherlands ............................ 8402225

[51] Int. Cl.$^4$ ............................................. C03B 37/027
[52] U.S. Cl. ............................................. 65/2; 65/12; 65/108; 65/109
[58] Field of Search .................... 65/3.12, 13, 12, 18.2, 65/2, 108, 109; 219/121 PY, 121 P

[56] References Cited

U.S. PATENT DOCUMENTS

| 3,646,308 | 2/1972 | Spiessens | 219/121 PY |
| 3,737,292 | 6/1973 | Keck | 65/13 |
| 3,737,293 | 6/1973 | Maurer | 65/13 |
| 4,304,581 | 12/1981 | Saifi | 65/3.12 |
| 4,341,441 | 7/1982 | Lighty | 65/3.12 X |
| 4,402,720 | 9/1983 | Edahiro | 65/3.12 |
| 4,417,911 | 11/1983 | Cundy | 65/3.12 |
| 4,440,556 | 4/1984 | Oh | 65/13 |
| 4,596,589 | 6/1986 | Perry | 65/3.12 |

FOREIGN PATENT DOCUMENTS

| 0097348 | 1/1984 | European Pat. Off. | |
| 2436111 | 5/1980 | France | 65/13 |

OTHER PUBLICATIONS

Koel, G. J., "Technical and Economic Aspects of the Different Fibre Farbication Processes," Proc. 8th Duro. Conf. on Optical Communication, Cannes., Sep. 1982, pp. 1-8.

Primary Examiner—Kenneth M. Schor
Attorney, Agent, or Firm—Ernestine Bartlett

[57] ABSTRACT

Solid glass preforms are made by externally heating a tubular preform by a plasma which is reciprocated along the hollow tube. The plasma gas consists entirely or partly of a molecular gas ($N_2$ or $O_2$, for example). The hollow preform is preferably rotated during collapsing.

9 Claims, 1 Drawing Sheet

METHOD OF MANUFACTURING SOLID GLASS PREFORMS FROM HOLLOW PREFORMS

This is a division of application Ser. No. 759,568, filed July 26, 1985, which is a continuation-in-part of application Ser. No. 697,553, filed Feb. 1, 1985, both of which are now abandoned.

BACKGROUND OF THE INVENTION

The invention relates to a method of manufacturing solid glass preforms for the manufacture of optical components. The solid preforms are manufactured by collapsing hollow preforms having a refractive index which varies across the wall thickness to achieve desired properties. The hollow preform is collapsed by moving a heating zone along the preform. The length of the heating zone is smaller than the length of the hollow preform.

The hollow preform collapses due to the surface tension of the heated glass and possible pressure differences. In this connection glass is to be understood to include also quartz glass.

Optical fibers can be drawn from solid preforms obtained by the method according to the invention. Lenses can be manufactured from solid preforms having graded refractive index distributions by dividing the preform into wafers of suitable thickness.

The hollow preforms may consist, for example, of quartz tubes. The tubes are coated on their insides with one or more glass layers of suitable refractive indices as desired for the optical components to be manufactured from the solid preform. The refractive index may increase in one or more steps or continuously from the outside to the inside. Hollow preforms may alternatively be obtained by providing glass particles on a mandril in layers having refractive indices which vary as desired.

Methods of manufacturing hollow preforms are known per se. Several such methods are described by G. J. Koel in an article entitled "Technical and economic aspects of the different fibre fabrication processes" (Proceedings of the 8th European Conference on Optical Communication, Cannes, September 1982, pp. 1–8).

The collapsing temperature for internally coated quartz tubes is between approximately 1900° and 2200° C. Generally, hydrogen-oxygen burners are used for collapsing internally coated quartz tubes. In practice, the temperature of a flame of such a burner usually is not much more than 2500° C. As a result, the heat flux is comparatively low and the time required to completely collapse the tube to form a solid preform is rather long, particularly if the hollow preforms have large diameters. The heat transfer takes place by transfer of kinetic energy of gas molecules to the glass.

A comparatively long collapse time requires measures to suppress the evaporation of comparatively volatile constituents from the innermost glass layers or to remove the disadvantages thereof (for example by etching away, immediately prior to the closing of the cavity in the preform, a layer from which the volatile constituent has been evaporated). However, these measures are difficult to control and they require much effort to obtain reproducible results.

It is furthermore of great importance that during the collapsing process a good geometry is maintained. During the collapsing process acentricity, bending or sagging of the preform should be avoided. This is of importance in particular if the solid preform is again inserted into a quartz tube and together with the latter is drawn into an optical fiber.

Nonuniform heating of the hollow preform and a nonuniform pressure on the exterior of the preform must therefore be prevented as much as possible during the collapsing process.

SUMMARY OF THE INVENTION

It is an object of the invention to considerably increase the thermal flux to the tube to be collapsed and to solve or prevent as much as possible other problems which may occur in collapsing preforms with the use of moving gas burners.

According to the invention, this object is achieved by a method in which during the collapsing process the tube is heated externally by a plasma. In practice an isothermal plasma is used with which sufficiently high temperatures are reached to cause the collapse of a quartz tube substantially under the influence of the surface tension of the glass. An isothermal plasma is to be understood to mean herein a plasma of which all constituents (electrons, atoms, ions, etc.) have substantially the same high temperature and which is generated by an electric field.

It has been found in practice that the collapsing time can be considerably reduced by using a plasma. This means that the manufacturing process can be considerably speeded up.

The collapsing time can be particularly reduced if, according to a preferred embodiment of the method according to the invention, the plasma gas consists entirely or partly of a molecular gas which may dissociate, for example nitrogen and/or oxygen. Such a plasma consists at least partly of dissociated molecules. When the dissociated atoms collide at the glass surface, molecules of the gas are reformed. In addition to kinetic energy, the heat of formation of these molecules is also released at the glass surface. Per unit of time the quantity of energy transferred to the glass surface is larger than is possible with either gas burners or plasmas based on atomic gases.

Other advantages which can be obtained by the method according to the invention are as follows. The process may be carried out in a dust-free gas atmosphere which is free from impurities which might influence the mechanical and/or optical properties of optical components, for example optical fibres, to be manufactured from the preform. Also, the collapsing process may be carried out, for example, in an atmosphere which consists entirely or partly of oxygen. It has been found in practice that an oxygen atmosphere reduces the rate of evaporation of silicon dioxide from the outside of the tube. Reduction of silicon dioxide to silicon monoxide is also prevented.

The plasma may be ignited in an argon atmosphere. Oxygen or air is then added to the argon so that an oxygen-containing atmosphere is formed. The argon may optionally be replaced entirely by oxygen. A suitable plasma gas consists of 33% by volume of argon and 67% by volume of air.

In some embodiments it is advantageous to rotate the hollow preform during the collapsing process. This is the case in particular if the preform is not surrounded by a plasma, but the plasma burner is directed to the axis of the hollow preform at an angle exceeding 0°. The speed of rotation is, for example, from 0.5 to 5 rps. During the rotation of the tube, swinging movements should be avoided. In practice speeds of 0.5 to 2 rps gave good results. By these measures the hollow preform uniformly collapsed in all circumstances.

In a practical embodiment, the tube was heated by a plasma burner in which the plasma gas was directed at an angle of approximately 90° to the axis of the hollow preform. For example, the axis of the plasma burner is directed toward the earth's surface, and the burner is arranged so that the the plasma flame emanates from the burner remote from the earth's surface. In such an arrangement the symmetry of the plasma and hence the uniform heating of the work piece is hardly influenced by gravity. In particular there is little or no influence by gravity if the axis of the burner is directed perpendicular to the earth's surface.

The hollow preform the is preferably collapsed as follows.

The hollow preform, for example a tube of quartz glass which is coated on its inside with doped quartz glass, is fixed horizontally by rotatable holders. These holders may be of such a construction that during the rotation a gas can be passed through the tube. Such a construction may be used to produce certain desirable effects during the collapsing process.

The plasma burner is then ignited and is guided past the rotating preform at a sufficiently low speed to collapse the preform by heating. It is not recommended to collapse the preform to a compact rod in one step. For collapsing in one step, such a high temperature is necessary that a substantial quartz glass is burned away.

After the part of the preform to be collapsed has been heated by the plasma, its plasma is moved back to the initial position at a sufficiently high speed to avoid any substantial heat transfer during this movement. If desired, contact of the tube with the plasma can be avoided during the return movement. In this manner, inhomogeneous heating during the return stroke is avoided.

The plasma is then moved along the preform again. Depending on the diameter of the tube to be collapsed and on the quantity of glass in the tube, this procedure may be repeated. In each following step, the speed at which the plasma is moved along the tube is chosen to be smaller.

In principle, the following embodiments of the method are, inter alia, possible.

A. The tube to be collapsed is surrounded by a plasma. The plasma burner surrounds the tube and is moved relative to the tube.
B. The tube to be collapsed is rotated and heated by a plasma flame emanating from a plasma burner. The tube and plasma flame are moved relatively to each other.

In principle, the tube to be collapsed may be arranged horizontally or vertically in both embodiments.

DESCRIPTION OF THE PREFERRED EMBODIMENTS

Figure 1:
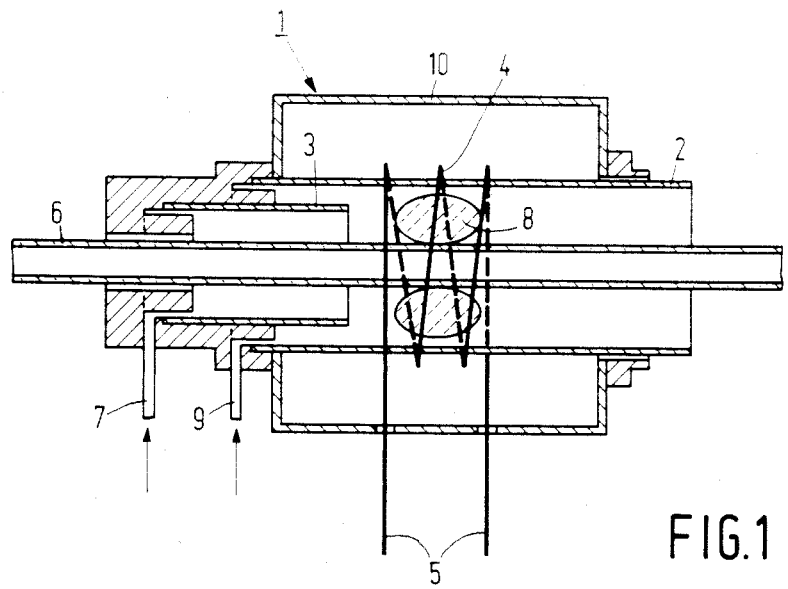
FIG. 1 schematically shows a part of a device for collapsing a glass tube, in which the tube is surrounded by a plasma (embodiment A).

The plasma burner 1 shown in FIG. 1 consists essentially of two quartz tubes 2 and 3 and a coil 4 having two turns. The coil 4 is connected to a high frequency generator (not shown) via a flexible cable 5.

The preform plasma burner 1 is reciprocated along the tube 6 by a device not shown. Initially, argon is blown laterally into the device via gas inlet 7 so that a whirling gas jacket is produced in the tube 3 around the preform tube 6 and continues in tube 2. The plasma 8 is then ignited. Air is blown past the wall of the tube 2 via gas inlet 9 to cool wall 2. As a result, the plasma is kept spaced from the wall 2. The plasma burner is screened by a cylindrical screen 10 of aluminum in which air is present which is refreshed continuously (not shown).

The plasma is preferably generated inductively by an alternating electric field having a frequency less than 12 MHz but of a sufficiently high frequency to be able to ignite and maintain a plasma in the gas atmosphere which surrounds the preform tube to be collapsed. At this comparatively low frequency, the space between the tube 6 to be collapsed and the tube 2 of the plasma burner 1 is filled with plasma during the entire collapsing process. If the frequency is larger than 12 MHz this is not always the case. Upon collapsing at higher frequencies, the outer surface of the collapsing tube 6 may, when collapsed to a certain diameter less than the initial diameter, no longer be contacted by the plasma. Consequently the heat transfer becomes too small to produce complete collapse to a solid rod.

At a comparatively low frequency less than 12 MHz the plasma proves to be sufficiently symmetrical to completely collapse the preform in a horizontal position.

Another advantage of using an electric alternating field having a comparatively low frequency is that no provision need be made to prevent flashover between the turns of the coil.

In practice it has been found that tubes can be collapsed to solid rods by the embodiment described with reference to FIG. 1. However, the process requires a very accurate control symmetrically heat the tube.

Figure 2:
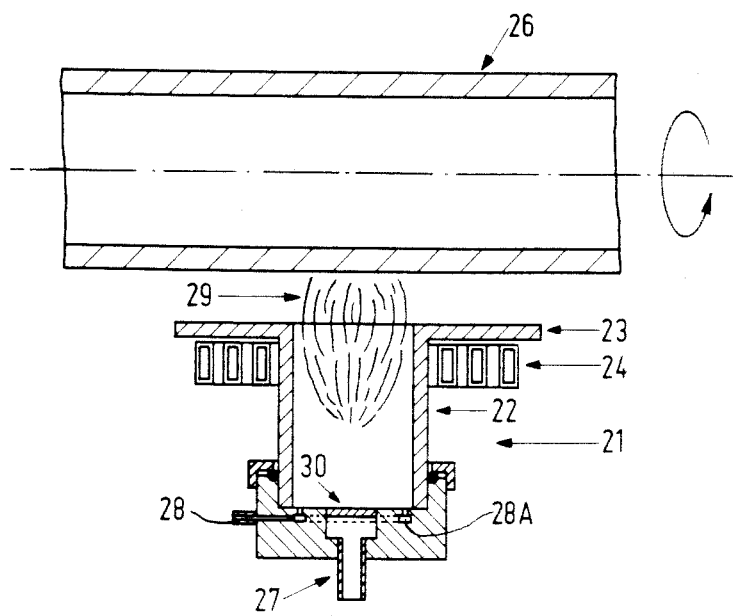
FIG. 2 schematically shows a part of a device for collapsing a glass tube in which the tube is rotated and is heated by a plasma flame (embodiment B).

The plasma burner 21 shown in FIG. 2 consists essentially of a vertically arranged quartz glass tube 22. Tube 22 has a quaartz glass rim 23, and a coil 24 formed from a copper pipe. Tube 22 and coil 24 can be moved relative to each other.

During operation of the device, water for coooling flows through the coiled pipe 24. The coil 24 is connected to a high frequency generator (not shown). The plasma burner 21 is reciprocated past the tube 26 by a device (not shown) in the direction of the double arrow at the bottom of FIG. 2.

On igniting the plasma, coil 24 is halfway down the glass tube 22 and argon is blown into the burner via the inlet 27. After the plasma has been ignited, the coil 24 is moved into the position shown in FIG. 2 with respect to the tube 22, and a molecular gas is blown in via the inlet 28 and the duct 28A. Duct 28A communicates via inclined ducts with the interior of the burner.

The plasma flame 29 emanates from the burner 21 and contacts the rotating tube 26. By laterally blowing in air, a whirlwind is produced in the burner so that the plasma is urged toward the axis of the tube 22. As a result, tube 22 is not heated to too high a temperature. A porous plate 30 is provided in the bottom of the burner.

Plate 30 ensures that no dust particles can land in the burner space and that the argon flow is uniformly distributed in the space enclosed by tube 22 so that a laminar gas flow is formed. The result of all this is that a uniformly burning plasma flame is obtained and air is not drawn into the tube via the aperture through which the flame emanates from the burner.

Inter alia, the following results were achieved by the device shown in FIG. 2.

A quartz glass tube was coated internally with $GeO_2$-doped quartz glass by a vapour deposition process. The coated tube had an inside diameter of 16.4 mm, an outside diameter of 25.2 mm, and a length of 70 cm.

The coated tube was collapsed to form a solid rod by moving the plasma burner twice along the tube. During the first pass, in this case in the horizontally-arranged tube from the left to the right, the speed at which the plasma burner was moved past the tube was 1.8 cm/min. When the plasma reached the end of the part of the tube to be collapsed, it was returned quickly to its initial position so that the tube was not substantially heated on the return stroke.

In the subsequent pass (again from the left to the right) the speed of the plasma was 0.3 cm/min. The heated part of the tube was now closed completely.

The firing loss was 14.1% by weight. The speed of rotation was 1 rps.

In another embodiment, a quartz glass tube coated internally with doped quartz glass was also collapsed in two strokes. The outside diameter of the tube was 25 mm, the inside diameter was 21 mm, and the tube length was 70 cm. The speed of the plasma during the first pass was 3.5 cm/min; during the second pass it was 1.8 cm per min. The firing loss was 10%. The speed of rotation in this case was 2 rps.

In both cases the plasma gas during both passes was an argon-air mixture (33%-67%). The temperature of the plasma was at least 10,000° K. The plasma had no detrimental effect on the optical properties of the fibers drawn from the collapsed preforms.

What is claimed is:

1. A method of manufacturing solid glass preforms, said method comprising the steps of:
   providing a hollow tubular glass preform having a length such that its central axis is arranged horizontally with respect to gravity;
   heating the tubular preform at a heating zone in order to collapse a portion of the tubular preform at the heating zone; and
   moving the heating zone along the length of the tubular preform until the entire tubular preform is collapsed into a solid glass preform;
   wherein the step of heating the tubular preform comprises the step of contacting the tubular preform with a plasma symmetrically surrounding the prreform and generated in a plasma gas outside the preform via a plasma generating means, the plasma being generated by an alternating electric field having a frequency less than substantially 12 mhz but sufficiently high to be able to ignite and maintain a plasma in the plasma gas such that the space between the plasma generating means and the tubular preform remains substantially filled with plasma during substantially the entire collapsing of the tubular preform.

2. A method as claimed in claim 1, wherein:
   the tubular preform has a central axis in the direction of its length; and
   during the collapsing, the tubular preform is arranged horizontally and is rotated around its central axis.

3. A method as claimed in claim 2, wherein during collapsing the tubular preform is rotated at 0.5 to 5 rotations per second.

4. A method as claimed in claim 3, wherein the flow of plasma gas is directed at an angle of 90° with respect to the axis of the tubular preform.

5. A method as claimed in claim 4, wherein the flow of plasma gas is directed away from the earth's surface.

6. A method as claimed in claim 5, wherein the flow of plasma is directed perpendicular to the earth's surface.

7. A method as claimed in claim 6, wherein the heating zone has a length which is less than the length of the tubular preform.

8. A method as claimed in claim 1, wherein the step of moving the heating zone comprises:
   (A) moving the heating zone from a first position along the length of the tubular preform to a second position along the length of the tubular preform at a relatively slow speed to heat the tubular preform in order to collapse it;
   (B) moving the heating zone from the second position to the first position at a relatively high speed to avoid substantial heat transfer to the tubular preform; and
   repeating steps (A) and (B) until the tubular preform is collapsed into a solid preform.

9. A method as claimed in claim 8, wherein the magnitude of the relatively slow speed is decreased each time step (A) is repeated.

* * * * *